Aug. 16, 1966     P. S. ZAK     3,266,334

MODIFIED GLOBOID GEARING

Filed May 14, 1964

United States Patent Office 3,266,334
Patented August 16, 1966

3,266,334
MODIFIED GLOBOID GEARING
Pavel Samoilovich Zak, Moscow, U.S.S.R., assignor to Vsesoyuzny Nauchno-Issledovatelsky i Proektno-Tekhnologichesky Institute Ugoljnogo Mashinostrojenija, Moscow, U.S.S.R.
Filed May 14, 1964, Ser. No. 367,369
4 Claims. (Cl. 74—458)

The present invention relates to enveloping worm gearings and more particularly, to enveloping worm gearings with a modified helix line of the operating and generating worms.

More specifically, the present invention relates to enveloping worm gearing comprising an hour-glass or throated worm and a worm gear with a concave root line in an axial section. Such worm gearing is sometimes called double-enveloping.

A conventional enveloping worm gearing is already known which is characterized by a constant angular lead of the worm thread equal to $2\pi:i$, wherein $i=Z_2:Z_1$ which is the gear ratio. The worm gear has teeth conjugate with such a worm. This kind of gearing is also known as the Cone or Hindley type.

It has been already proposed to modify this conventional form of enveloping worm gearing by providing a certain divergence of the worm thread path from the thread path of the conventional worm gearing. The worm thread path of the enveloping worm is here defined as the curve obtained when the working surface of the worm thread is intersected by the surface of a torus coaxial with the worm. The circumference, by the rotation of which said torus is obtained, having its center offset from the axis of the worm by a value equal to the interaxial distance of the gearing, the surface of said torus being disposed approximately midway between the surface of the top and the surface of the root of the worm threads.

Said modification of the enveloping worm is characterized by the value of divergence of its thread helix from that of the conventional worm.

The best practical results have been obtained when the thread path diverges into the body of the worm thread at its ends. If the worm gear is conjugate to such worm, then the gearing differs from the conventional one and is usually called a modified enveloping worm gearing. The physical change of such divergence along the length of the worm starting from its entering end is usually called the modification law and characterized by a modification curve with the value of divergence or modification being plotted along the ordinate, and the value of the angle of turn of the worm thread axial profile generatrix, along the abscissa starting from the entering edge thereof.

It has been also proposed and is technologically expedient to choose the modification curve of the form of a continuous smooth curve without curve reversal, the best results in the service of gearings being obtained when the extremum point of the modification curve, i.e., the point of minimum deviation of the modification curve lies between the mid-portion of the worm and the exit end thereof.

The disadvantage of known solutions is the presence of an undercutting zone on the surface of the worm gear tooth which results in respective discontinuity of the field of contact. The undercutting is due to the penetration of the exit portion of the worm thread which is beyond the minimum point of the modification curve, into the enveloping surface of the worm gear tooth. Stated otherwise, when the end of the worm thread passes the extremum or point of minimum deviation, it penetrates into and undercuts the subsequent enveloping surface.

Though attempts were made to eliminate this undercutting they proved to be of no commercial success. It is possible, of course, to establish a form of modification curve in which there would be no undercutting on said exit portion of the worm thread. It is much more important, however, to provide the required form of the modification curve on the entering portion from the entering end of the worm thread up to the extremum point. It is rather difficult to satisfy both these conditions.

Therefore, I do not claim as my invention such gearing in which a definite form of the modification curve on the exit portion of the worm is preset, or such gearing in which the form of the modification curve is modified on the entering portion of the worm, but I do claim such gearing in which the entire exit portion of the worm beyond the extremum point of the modification curve is brought out of mesh and the worm gear has teeth whose working surface is conjugate to said worm.

The applicant has established that the form of the modification curve of the worm, including the magnitude of modification on the entering portion and the position of the extremum point is of paramount importance for improving the service characteristics (wear resistance and efficiency) of the enveloping worm gearing. From a standpoint of a practical realization of such law of modification, when manufacturing the working worm and the generating worm (hob) great technological advantages may be gained with a modification curve close to a parabola or to any other similar curve without curve reversal.

The applicant has also established that if, when choosing the modification curve, its form is predetermined as being most advantageous for the entering portion, then the exit portion is usually the source of the above-described undercutting, which also brings about deterioration of the contact conditions on the entering portion of the contact field due to the fact that a portion of the tooth surface will be brought out of mesh.

The main object of the present invention is to provide such modified enveloping worm gearing in which there will be eliminated the undercutting of the enveloping surface of the worm gear tooth.

Said object is achieved by the use of a modified enveloping worm gearing which comprises an enveloping worm with a continuous modification curve of its thread helix directed into the thread body, and a worm gear whose teeth envelop the worm and are generated by a hob with the generating surface coinciding with the surface of the worm threads, in which enveloping worm gearing, in accordance with the invention, the surface of the worm threads is defined by the portion from the entering end to the extremum point of the modification curve; the teeth of the worm gear may also be generated by means of a hob with the generating surface coinciding with the surface of the worm threads in the mid-portion thereof and with a gradual divergence towards both its edges and along its height, the initial contact between the teeth of the worm gear and the threads of the worm being in the form of a zone localized in the mid-portion of the working surface of the worm thread with respect to the length and height of said thread and in the mid-portion of the working surface of the worm gear tooth so that in the process of running-in, said zone gradually and uniformly expands over the entire working surfaces of the worm threads and the worm gear teeth.

It is an object of the present invention to eliminate undercutting of the enveloping surface of the worm gear tooth whereby a contact field is obtained constituted by two leaves with advantageous contact conditions on each of said leaves.

The present invention also eliminates the influence of unavoidable deformations as well as inaccuracies, arising in the process of manufacturing and assembly, upon the operation of the worm gearing, which is ensured by the initial mating of the generating worm and the working worm in the mid-portion of the field of contact.

The objects and advantages of the invention will become apparent from the following description and accompanying drawings in which:

FIG. 1 diagrammatically represents the generation of the worm thread helix of an enveloping worm gearing;

Figure 1:
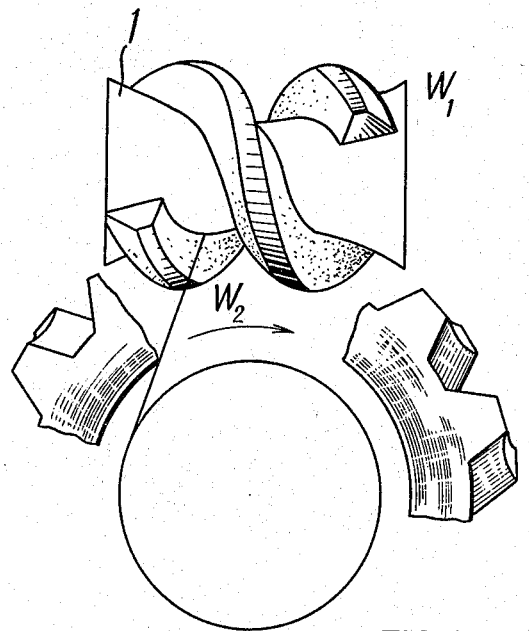

The conventional form of the enveloping gearing is characterized by a constant ratio of the angular rotation speed $\omega_1$ of worm 1 and the angular rotation speed $\omega_2$ of the profile generatrix (FIG. 1). Thereby, there will be generated a helical curve for the enveloping gearing on the worm 1. Stated in another way, the enveloping gearing defines an intersection with the worm constituted of a helical line extending along the worm 1.

Figure 3:
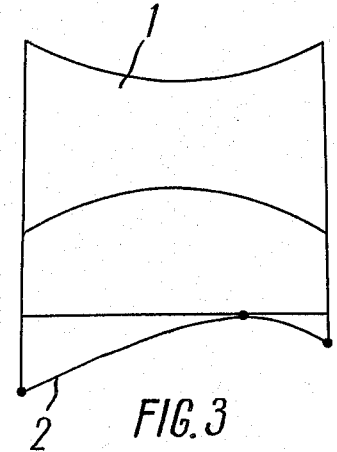
FIG. 3 shows a modification curve of the worm thread helix in case of the entire length of the worm being used; shown above is the initial surface of the worm torus.
Figure 2:
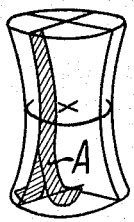
FIG. 2 shows a field of contact consisting of two parts and inherent to the conventional form of the enveloping worm gearing.
Figure 4:
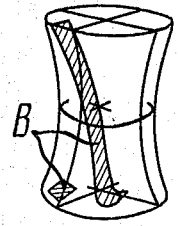
FIG. 4 shows the field of contact corresponding to the modification of the curve of the worm thread which is shown in FIG. 3.

The field of contact B of the modified enveloping worm gearing, corresponding to the modification law, the curve 2 or which is shown in FIG. 3, has a diagonal form and a discontinuity due to undercutting as shown in FIG. 4. Modification curve 3 of the working worm and modification curve 4 of the generatrix worm (FIG. 5) are limited by the extremum point A. The field of contact corresponding to the enveloping worm gearing with a worm without the exit portion beyond the extremum point is divided into two leaves as shown in FIG. 6, on each of said leaves there being advantageous contact conditions, the same as on portion A of the field of contact of the conventional enveloping worm gearing shown in FIG. 2 and on the field of contact of a modified enveloping worm gearing with the use of the entire length of the worm (FIG. 4).

Another embodiment of the same concept is also possible, this time not by the elimination of the exit portion of the worm beyond the extremum point of a preset modification curve, but by changing the modification curve in such a way that the extremum point of the modification curve be offset to the very end of the exit portion of the worm threads. Hence, in this case the worm threads will also have the working surface defined by the portion from the entering end to the extremum point of the modification curve.

Modification curve 3 of the working worm and modification curve 4 of the generating worm (FIG. 5) coincide in one point 0 located in the mid-portion of the field of contact, and diverge towards the ends thereof. Such a relative form of the modification curves provides for the initial mating of the generating worm and the working worm in the mid-portion and, hence, excludes the influence of unavoidable inaccuracies in the process of manufacturing and assembly.

In accordance therewith the initial contact between the worm and the worm gear will have the form of a certain point localized in the mid-portion of the surface of the worm threads along the length and height thereof, as well as in the mid-portion of the working surface of the worm gear teeth.

Figure 5:
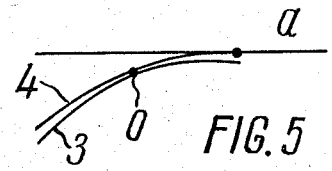
FIG. 5 shows the modification curves of the working and generating worms.
Figure 6:
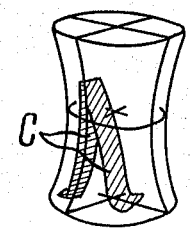
FIG. 6 shows the field of contact corresponding to the enveloping worm gearing with a worm with no exit portion beyond the extremum point of the modification curve.

As a limit the initial contact may be in the form of a point such as point 0 as shown in FIG. 5.

The clearances between the surfaces of the worm threads and the surfaces of the worm gear teeth should gradually increase from the initial point of contact towards the edges of the working surfaces of the worm threads and the worm gear teeth, presenting certain flanks which may be made either on the worm or on the worm gear. It is preferable to provide flanks on the worm threads, though it is not essential and the flanks may be provided on the worm gear by changing the form of the generating worm.

In the course of running-in, the zone of contact expands from the mid-portion towards the ends finally enveloping the entire field of contact.

Though the present invention is described in accordance with the preferred embodiment thereof, various modifications of the described invention may be effected by persons skilled in the art without departing from the principle and scope of the invention as defined in the appended claims.

What is claimed is:

1. An enveloping worm gearing comprising a worm having opposite ends constituting an entering end and an exit end, said worm including a thread wound thereon along a continuous curved line which deviates from a normal helical line, said curved line being tangential with said helical line at an intermediate point of extremus and deviating from said line from said extremus point towards the entering end of the worm, and a worm gear having teeth enveloping said worm and including working surfaces conjugate with said worm.

2. An enveloping worm gearing comprising a worm having opposite ends constituting an entering and an exit end, said worm including a thread wound thereon along a continuous curved line which deviates from a normal helical line from the entering end to a point of minimum deviation, and a worm gear having teeth enveloping said worm and including working surfaces conjugate with said worm, the thread of said worm having a surface defined by the portion of the thread extending from the entering end to the point of minimum deviation.

3. An enveloping worm gearing comprising a worm having opposite ends constituting an entering end and an exit end, said worm including a thread wound thereon along a continuous curved line which deviates from a normal helical line, said curved line having an extremus point of minimum deviation from the helical line, said thread having a surface defined by the portion of the curved line deviating from said helical line from the entering end to the vicinity of said extremus point such that said worm gearing is adapted to cooperate with a worm gear having teeth with working surfaces conjugate to said worm thread and consequent initial contact at a prescribed contact point located centrally along the length of the thread surface and midway of the height thereof.

4. A modified enveloping worm gearing comprising an enveloping worm with a continuous modification curve of the helix of the thread thereof and free of curve reversal, and a worm gear whose teeth envelop said worm; the initial contact of the worm and the worm gear being limited by an initial contact spot localized in the mid-portion of the field of contact along the length of said worm, the rest of the field of contact being provided with small clearances gradually increasing in the direction from the initial contact spot towards the ends of the field of contact both along the height of the profile and along the length of said worm so that during the initial wear of the worm gearing in the course of its service there will be provided a gradual and uniform expansion of said contact spot over the entire working surfaces of the worm threads and worm gear teeth; the threads of said worm having the surface defined by the portion between the entering end and up to a pre-established point in the vicinity of the minimum point of deviation of the modification curve.

References Cited by the Examiner
UNITED STATES PATENTS 3,045,557   7/1962   Yamamoto et al. ___ 74—458 X DAVID J. WILLIAMOWSKY, *Primary Examiner.*

DON A. WAITE, *Examiner.*

R. J. BIRD, L. H. GERIN, *Assistant Examiners.*